United States Patent

[11] 3,604,042

| [72] | Inventors | Raymond Muir Bremner<br>Don Mills, Ontario;<br>James M. Frew, Weston, Ontario, both of,<br>Canada |
|---|---|---|
| [21] | Appl. No. | 868,764 |
| [22] | Filed | Oct. 23, 1969 |
| [45] | Patented | Sept. 14, 1971 |
| [73] | Assignee | Raymond M. Bremner<br>Ontario, Canada |

[54] PIPE-CLEANING TOOL
4 Claims, 3 Drawing Figs.

[52] U.S. Cl. .................................................. 15/104.13,
15/104.3
[51] Int. Cl. ...................................................... B08b 9/02
[50] Field of Search ............................................ 15/104.05,
104.09, 104.1, 104.12, 104.13, 104.14, 104.3

[56] References Cited
UNITED STATES PATENTS

| 1,449,237 | 3/1923 | Maloy ........................... | 15/104.13 |
| 1,602,405 | 10/1926 | Fuchs ............................ | 15/104.12 |
| 1,712,835 | 5/1929 | McCracken .................. | 15/104.13 |

*Primary Examiner*—Edward L. Roberts
*Attorney*—Maybee & Legris

ABSTRACT: A cleaning device for removing fibrous material from the internal surface of a pipe comprises a rotary head adapted to be driven by a motor and to be towed through the pipe by a cable. The rotary head comprises a frame around which are distributed four scraper assemblies and four flexible combs. Each scraper assembly consists of a series of coaxial, freely rotatable cutting wheels each having a scraping edge and mounted on a shaft extending parallel to and spaced from the axis of the frame; the scraper assemblies are spring-biased away from said axis into engagement with the pipe surface.

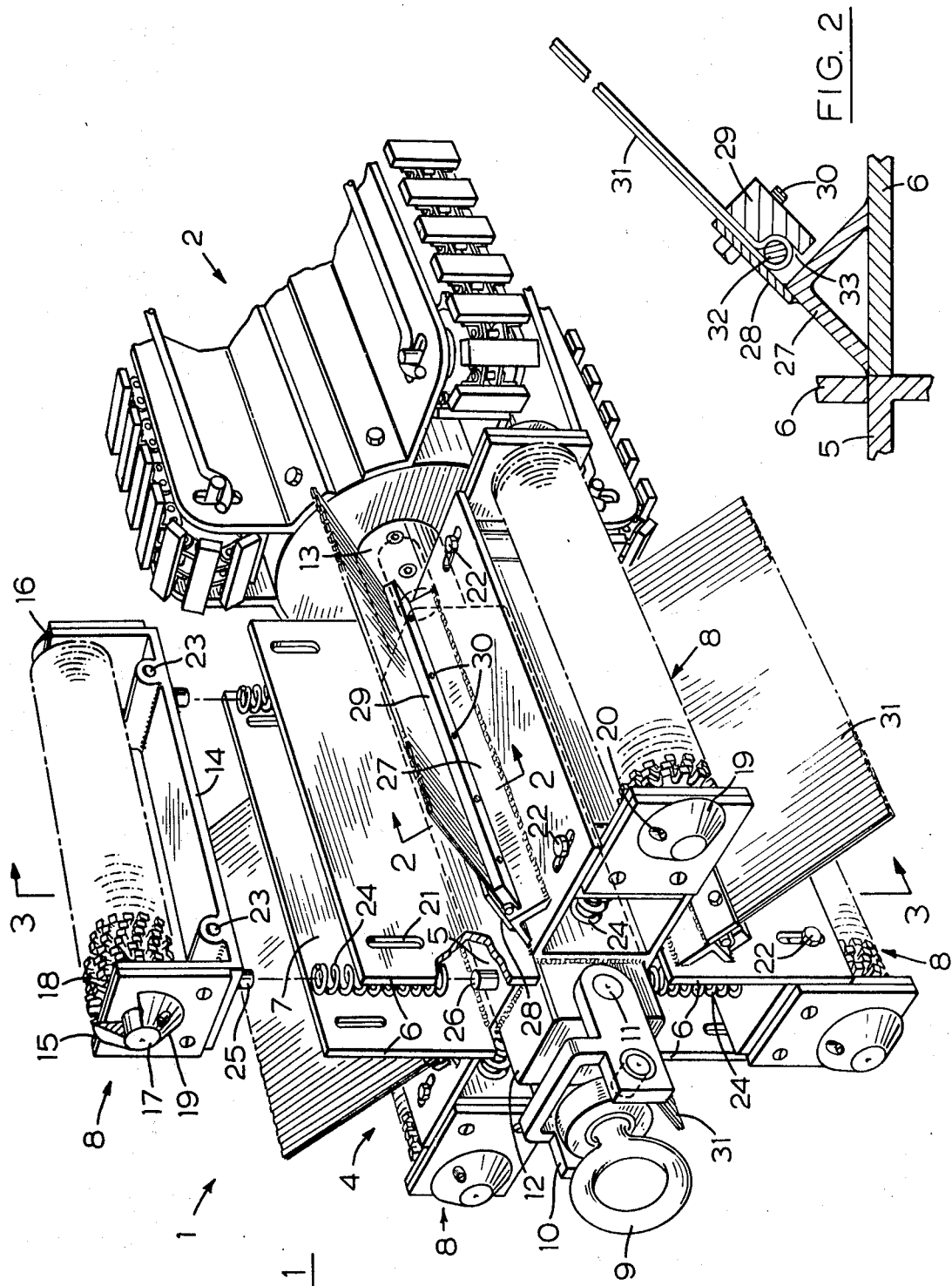

PIPE-CLEANING TOOL

BACKGROUND OF THE INVENTION

This invention relates to devices for cleaning the internal surfaces of pipes, and is more particularly concerned with the cleaning of sewer pipes in cities, municipalities, townships and villages. The invention is not limited to the cleaning of sewer pipes, however, but is applicable generally to the removal of fibrous vegetable matter and the like from the internal surfaces of pipes.

In my copending U.S. Pat. application Ser. No. 787,933, now U.S. Pat. No. 3,562,836, for "Reaming Tool" there is described a tool for reaming the internal surface of a pipe, the tool comprising a reaming head adapted to be driven by a motor mounted within a cylindrical housing, and a plurality of circumferentially spaced idlers mounted on the housing externally thereof, the idlers carrying means for frictionally engaging the internal surface of the pipe. The tool is towed through the pipe by a tow cable connected to a swivel coupling mounted at the front end of the reaming head. The reaming head itself is coupled to the motor to be driven thereby, and is formed with a series of circumferentially spaced abrasive cutters which, during operation, are adapted to cut through protruding lateral drains, calcite deposits, and other very hard obstructions which may be encountered.

A reaming tool as described in the above patent application, while very effective in removing hard obstructions, may in some cases be unsuitable for removing protruding roots of trees, fibrous vegetable matter, and other relatively soft items which offer insufficient resistance to enable them to be removed by straightforward reaming. The present invention provides a pipe-cleaning tool generally similar to the tool described in the above-mentioned patent application, but in which the reaming head is replaced by a rotary cleaning device especially adapted for dealing with fibrous roots and like obstructions by tearing and grinding them rather than cutting or reaming.

SUMMARY OF THE INVENTION

A rotary cleaning device in accordance with the invention comprises a frame having a longitudinal axis, swivel means at one end of the frame for connecting a low cable to the device, coupling means at the other end of the frame for coupling the device to a drive motor, a plurality of scrapers circumferentially distributed around the frame axis, each scraper consisting of a plurality of coaxial, freely rotatable cutter wheels each having a scraping edge, the wheels being mounted on a shaft extending longitudinally, and spring means biasing the scrapers radially away from the frame axis so that the scrapers will engage the pipe surface. Preferably a number of combs are secured to the frame at positions between the scrapers, each comb consisting of a row of flexible blades which extend radially from the frame so that their free ends engage the pipe surface to be cleaned.

BRIEF DESCRIPTION OF THE DRAWINGS

One embodiment of the invention will now be described by way of example with reference to the accompanying drawings in which:

FIG. 1 is a partly exploded perspective view of a rotary cleaning device in accordance with the invention;

FIG. 2 shows in cross section a detail of FIG. 1; and

DESCRIPTION OF THE PREFERRED EMBODIMENT

Figure 3:
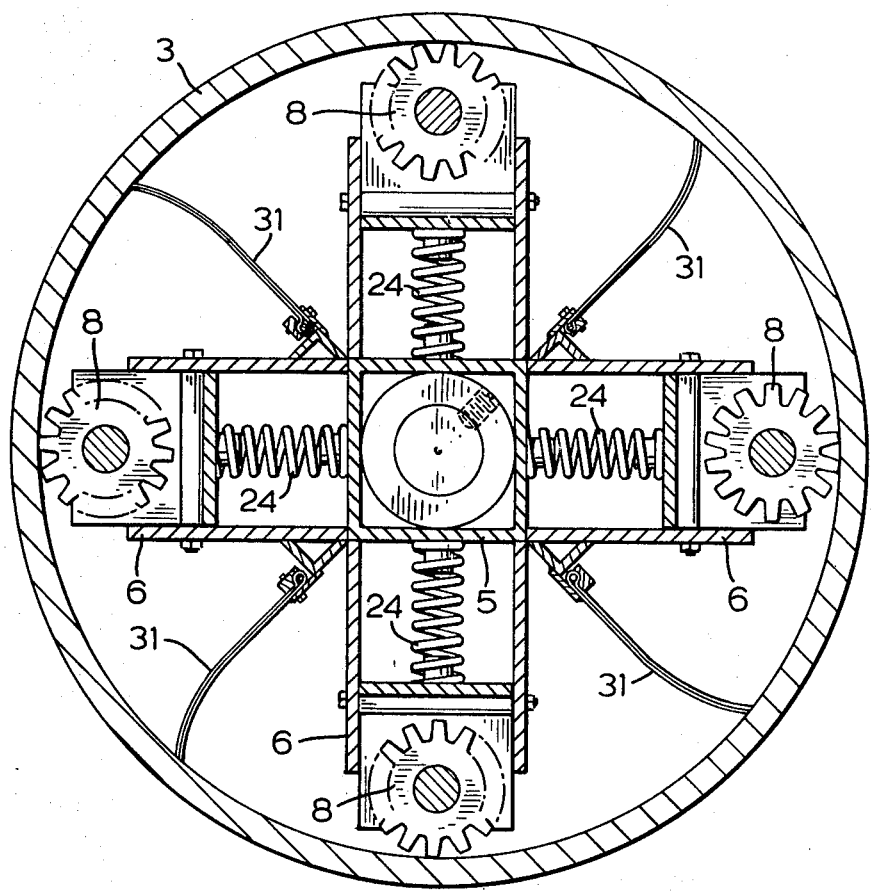
FIG. 3 is a cross-sectional view of the device.

A pipe-cleaning tool according to the invention comprises a rotary cleaning head 1 which is mounted on, or adapted to be mounted on, a driving assembly illustrated at 2 in FIG. 1. The driving assembly of the present embodiment is of the same construction as that described in detail in my copending U.S. Pat. application Ser. No. 787,933, and will not be described herein. Briefly, the driving assembly comprises: a cylindrical housing having front and rear ends, attachment means within the housing for securing one end of a retrieval cable, a motor mounted within the housing, means for connecting the motor to a power supply, a rotary shaft connected to the motor to be driven thereby, the rotary shaft being arranged coaxially with the housing and projecting from the front end thereof, and a plurality of idler assemblies mounted on the housing and circumferentially spaced around the outside thereof. Each idler assembly comprises a pair of longitudinally spaced idler sprockets, an endless track carried by the sprockets, a series of friction pads mounted on the endless track, and spring means for resiliently urging the friction pads radially outwardly into engagement with the internal surface of the pipe 3 (FIG. 3) being cleaned. In this way the driving assembly is prevented from rotating within the pipe, thus permitting the rotary head to be driven.

The rotary cleaning head, with which the present invention is concerned primarily, comprises a rigid metal frame 4 having a longitudinal axis, the frame providing a tubular central portion 5 of square cross section, and four pairs of parallel, longitudinally extending plates 6; each pair of plates forms a radially extending guide member defining a channel 7, whereby to locate a respective scraper assembly 8. The frame is of cruciform section as shown in FIG. 3.

At the front end of the frame 4 is a swivel means comprising a swivel coupling 9 mounted in a bracket 10 which is pivotally attached by pivots 11 to a projection 12 welded into the tubular portion 5 of the frame. The rear end of the frame 4 is formed with a tubular projection 13 which is to be coupled to the shaft of the driving motor.

The cleaning head has four scraper assemblies 8. Each scraper assembly comprises a subframe having a base portion 14 and two upstanding end plate portions 15 and 16, a shaft 17 extending between and being supported by the end plate portions 15, 16, and a plurality of coaxial, freely and independently rotatable cutter wheels 18 mounted on the shaft 17. The shaft is retained on the subframe by means of conical retaining collars 19 mounted on the ends of shaft and secured to it by setscrews 20. The cutter wheels 18 are all of the same diameter. Each cutter wheel is a steel disc having a series of radial toothlike projections to form a peripheral scraping edge for scraping and grinding fibrous roots and the like.

Each of the plates 6 is formed with a pair of parallel, radially extending guide slots 21, the slots being directly opposite the corresponding slots in the opposing plate of the pair. The subframes are located in the channels 7 and are retained in position by means of pins or bolts 22 which extend through the guide slots 21 and through transverse tubular holes 23 in the subframes. The subframes are thus prevented from moving longitudinally or laterally relative to the respective guide members, but are permitted to move radially by a limited amount. The subframes are biassed radially outwardly away from the frame axis by means of pairs of coil compression springs 24, the ends of which engage over aligned spigots 25 and 26 on the base portions 14 of the subframes and the frame 4 respectively.

On the outer surface of one plate 6 of each pair is welded a longitudinally extending angle member 27, the angle member lying in the corner formed by the adjacent plates of a neighboring pair. Welded to one surface of the angle member is a plate 28 to which a clamping bar 29 is clamped by clamping bolts 30. Between the plate 28 and clamping bar 29 are clamped a row of flexible metal blades 31 forming a comb, the blades extending radially outwardly from the frame 4 to a distance slightly greater than the scraper wheels 18 so that the free ends of the blades will engage the internal surface of the pipe and flex slightly as shown in FIG. 3. The blades 31 are formed by metal strips looped about a longitudinal rod 32, the looped portions of the blades lying in a recess or groove 33 on the inner face of the clamping bar 29.

In operation the device is towed through a pipe to be cleaned, such as a sewer pipe, by means of the tow cable connected to the swivel coupling 9. The device is rotated by means of the driving motor, independently of the motion of the device through the pipe, the assembly 2 being prevented from rotating by the idler assemblies which engage the pipe wall. Roots and other fibrous vegetable matter protruding from the internal pipe surface are torn, ground and beaten by the rotating combs and scrapers and thus removed from the pipe surface.

What I claim as my invention is:

1. A rotary device for cleaning the internal surface of a pipe, comprising:
   a. a frame having a longitudinal axis, said frame providing a plurality of radially extending guide members,
   b. swivel means at one end of the frame for connecting a tow cable to the device;
   c. coupling means at the other end of the frame for coupling the device to a drive motor for rotating the device about said axis;
   d. a plurality of scraper assemblies distributed around said axis, each scraper assembly consisting of
      i. a rigid subframe,
      ii. a shaft mounted on said subframe and extending parallel to and spaced radially from said longitudinal axis,
      iii. a plurality of coaxial, freely rotatable cutter wheels each having a scraping edge, mounted on said shaft,
   e. means connecting each of said subframes to a respective guide member for permitting limited radial movement thereof; and
   f. spring means bearing on the subframes for biassing the scraper assemblies radially away from said axis.

2. A rotary device as claimed in claim 1, wherein each guide member comprises a pair of parallel, longitudinally extending plates defining a channel, said plates being formed with parallel, radially extending elongated guide slots, and wherein each subframe is retained in the respective channel by pins connected to the subframe and extending laterally through the guide slots.

3. A rotary device as claimed in claim 1, further characterized by a plurality of longitudinally extending combs distributed around said axis, each comb consisting of a row of flexible blades extending radially from the frame and means for securing the blades at one end to the frame, the blades being of such a length as to bear at their free ends against the inner surface of the pipe to be cleaned.

4. A rotary device as claimed in claim 3, having four said scraper assemblies and four said combs, the scraper assemblies and combs being distributed around said longitudinal axis so as to alternate with one another.